United States Patent [19]

Aoki et al.

[11] Patent Number: 4,980,830

[45] Date of Patent: Dec. 25, 1990

[54] VEHICLE HEIGHT CONTROL SYSTEM WITH DEDUCTIVE NAUGHT OPERATION EXCLUSION MEANS

[75] Inventors: Hidenori Aoki, Kawasaki; Hiroshi Miyata, Toyota, both of Japan

[73] Assignee: Toyota Jidosha Kabushiki Kaisha, Aichi, Japan

[21] Appl. No.: 368,803

[22] Filed: Jun. 20, 1989

[30] Foreign Application Priority Data

Jun. 22, 1988 [JP] Japan .................. 63-154012

[51] Int. Cl.$^5$ ............................................. B60G 17/00
[52] U.S. Cl. ............................... 364/424.05; 280/707; 280/840
[58] Field of Search ............... 364/424.05; 280/6.1, 280/6.11, 707, 703, 704, 840, DIG. 1

[56] References Cited

U.S. PATENT DOCUMENTS

| | | | |
|---|---|---|---|
| 4,671,533 | 6/1987 | Asami et al. | 280/707 |
| 4,714,271 | 12/1987 | Buma et al. | 280/707 |
| 4,728,120 | 3/1988 | Buma et al. | 280/707 |
| 4,847,591 | 7/1989 | Ota et al. | 280/DIG. 1 |

FOREIGN PATENT DOCUMENTS 57-126705 8/1982 Japan .
62-77209 4/1987 Japan .

Primary Examiner—Gary Chin
Attorney, Agent, or Firm—Oliff & Berridge

[57] ABSTRACT

In a vehicle height control system comprising four actuators for controlling vertical positions of a pair of front wheels and a pair of rear wheels relative to a vehicle body and three vehicle height sensors for detecting the vertical positions relative to the vehicle body of three of the pairs of front and rear wheels except a fourth one of the pairs of front and rear wheels, a naught operation exclusion device is provided to prevent vehicle height control system to operate, the naught operation exclusion device detecting running on a rock or the like or falling in a hole or the like of the fourth wheel or jacking up of the vehicle body at the fourth wheel based upon a comparison of the vertical position relative to the vehicle body of a wheel diagonal to the fourth wheel detected by the vehicle height sensor therefor with similar relative vertical positions detected by the vehicle height sensors for the other two wheels located on opposite sides of a diagonal line connecting the fourth wheel and the one wheel diagonal to the fourth wheel.

5 Claims, 4 Drawing Sheets

VEHICLE HEIGHT CONTROL SYSTEM WITH DEDUCTIVE NAUGHT OPERATION EXCLUSION MEANS

BACKGROUND OF THE INVENTION

1. Field of the Invention

The present invention relates to a vehicle height control system, and more particularly, to a vehicle height control system comprising four actuators for controlling vertical positions of a pair of front wheels and a pair of rear wheels relative to a vehicle body to obtain a desired longitudinally and laterally balanced posture of the vehicle body, said four actuators being operated based upon output signals of three vehicle height sensors.

2. Description of the Prior Art

It is known in the art of modern automobile to incorporate such a vehicle height control system in the suspension structure of an automobile that comprises four actuators for controlling vertical positions of a pair of front wheels and a pair of rear wheels relative to a vehicle body so as to maintain a determinate longitudinally and laterally balanced posture of the vehicle body against unbalanced loading on the vehicle body. Such a vehicle height control system incorporates, when constructed according to an orthodox control concept, four vehicle height sensors for detecting the vertical positions relative to the vehicle body of the pairs of front and rear wheels so that each said actuator is operated based upon a difference of the vertical position relative to the vehicle body of each wheel from a determinate target value therefor so as to cancel said difference according to the conventional feedback control concept.

However, as a matter of principle it is possible to operate such four actuators for controlling the vertical positions of the pairs of front and rear wheels relative to the vehicle body so as to maintain a determinate longitudinally and laterally balanced posture of the vehicle body with three vehicle height sensors two of which are arranged as spaced along a longitudinal direction of the vehicle body while two of which are arranged as spaced along a lateral direction of the vehicle body so that, for example, the three vehicle height sensors detect the vertical positions of three of the pairs of front and rear wheels except a fourth one of the four wheels. In fact, it has been proposed in Japanese Patent Laying-open Publication No. 62-77209 to provide two such vehicle height sensors for a pair of front wheels and a third such vehicle height sensor for one rear wheel. In a prior art referred to in the above publication the actuators for the pair of front wheels are independently operated based upon the vertical position detecting operation of the corresponding pair of vehicle height sensors, while the actuators for the pair of rear wheels are synchronously operated based upon the vertical position detecting operation of the single vehicle height sensor applied to one of the pair of rear wheels. In the above-mentioned Japanese publication it is further proposed to suspend the vehicle height control operation of the actuators for the pair of front wheels when a comparison of output signals from the pair of vehicle height sensors for the pair of front wheels increases so much as to indicate that one of the pair of wheels has run on a rock or the like or has fallen in a hole or the like or the vehicle body has been jacked up at said one wheel.

SUMMARY OF THE INVENTION

The present invention is based upon the recognition that information necessary for maintaining a determinate longitudinally and laterally balanced posture of a vehicle body is available from three vehicle height sensors as described in the aforementioned Japanese publication, and that further it is more profitable from the view point of manufacturing costs to provide the third vehicle height sensor so as to detect the vertical position relative to the vehicle body of a fourth wheel, not a mean vertical position relative to the vehicle body of a third and a fourth wheel, particularly in view of the fact that such a mean vertical position relative to the vehicle body of the third and fourth wheels is not available by a single sensor such as applied to a middle portion of a rear shaft in a vehicle employing a four wheels independent suspension. Further, the present invention is based upon the recognition as already proposed in the above-mentioned Japanese publication that the vehicle height control system should be suspended from doing naught operation when it was detected by the vehicle height sensors that a wheel has run on a rock or the like or has fallen in a hole or the like or the vehicle body has been jacked up at a wheel because such a naught vehicle height control operation would soon bring about an undesirable over control.

Based upon the above recognitions, and in view of the fact that although running on a rock or the like or falling in a hole or the like of those wheels or jacking up of the vehicle body at those wheels for which the vehicle height sensors are provided can be directly detected by the corresponding vehicle height sensors, running on a rock or the like or falling in a hole or the like of the fourth wheel or jacking up of the vehicle body at the fourth wheel for which no vehicle height sensor is provided is detected by no vehicle height sensor, it is the object of the present invention to improve such a vehicle height control system having four independently operable actuators for four wheels but only three vehicle height sensors for only three of the four wheels so as to be able to deductively exclude its naught operation for the fourth wheel provided with no vehicle height sensor when it has run on a rock or the like or has fallen in a hole or the like or the vehicle body has been jacked up at said fourth wheel.

According to the present invention, the above-mentioned object is accomplished by a vehicle height control system comprising four actuators for controlling vertical positions of a pair of front wheels and a pair of rear wheels relative to a vehicle body, three vehicle height sensors for detecting said vehicle positions relative to the vehicle body of three of said pairs of front and rear wheels except a fourth one of said pairs of front and rear wheels, an actuator control means for selectively operating each said actuator so as to maintain a determinate longitudinally and laterally balanced posture of the vehicle body according to output signals of said three vehicle height sensors, and a naught operation exclusion means which compares the output signal of one said vehicle height sensor for detecting said vertical position relative to the vehicle body of one said wheel diagonal to said fourth wheel with the output signal of each one of the other two said vehicle height sensors so as to detect at least either an abnormal rise or an abnormal fall of said fourth wheel relative to the vehicle body, and prevents said actuator control means to control said actuators when at least either said abnormal rise or said abnormal fall of said fourth wheel relative to the vehicle body is detected.

Said naught operation exclusion means may be constructed to prevent said actuator control means to control said actuators when a positive difference of the vertical position relative to the vehicle body of said one wheel detected by said one vehicle height sensor with respect to a similar relative vertical position detected by one of two other said vehicle height sensors is equal to or greater than a predetermined positive threshold value and a positive difference of the vertical position relative to the vehicle body of said one wheel detected by said one vehicle height sensor with respect to a similar relative vertical position detected by the other of said two other vehicle height sensors is equal to or greater than a predetermined positive threshold value.

Further, said naught operation exclusion means may be constructed further to prevent said actuator control means to control said actuators when a negative difference of said vertical position relative to the vehicle body of said one wheel detected by said one vehicle height sensor with respect to a similar relative vertical position detected by one of two other said vehicle height sensors is equal to or smaller than a negative predetermined threshold value and a negative difference of said vertical position relative to the vehicle body of said one wheel detected by said one vehicle height sensor with respect to a similar relative vertical position detected by the other of said two other vehicle height sensors is equal to or smaller than a predetermined negative threshold value.

Alternatively, said naught operation exclusion means may be constructed to prevent said actuator control means to control said actuators when a sum of a positive difference of said vertical position relative to the vehicle body of said one wheel detected by said one vehicle height sensor with respect to a similar relative vertical position detected by one of two other said vehicle height sensors and a positive difference of said vertical position relative to the vehicle body of said one wheel detected by said one vehicle height sensor with respect to a similar relative vertical position detected by the other of said two other vehicle height sensors with respective positive modification factors is equal to or greater than a predetermined positive threshold value.

Further, said alternative naught operation exclusion means may be constructed further to prevent said actuator control means to control said actuators when a sum of a negative difference of said vertical position relative to the vehicle body of said one wheel detected by said one vehicle height sensor with respect to a similar relative vertical position detected by one of two other said vehicle height sensors and a negative difference of said vertical position relative to the vehicle body of said one wheel detected by said one vehicle height sensor with respect to a similar relative vertical position detected by the other of said two other vehicle height sensors with respective positive modification factors is equal to or smaller than a predetermined negative threshold value.

BRIEF DESCRIPTION OF THE DRAWINGS

In the accompanying drawings.

DESCRIPTION OF THE PREFERRED EMBODIMENTS

In the following the present invention will be described in more detail with respect to some preferred embodiments with reference to the accompanying drawings.

Figure 1:
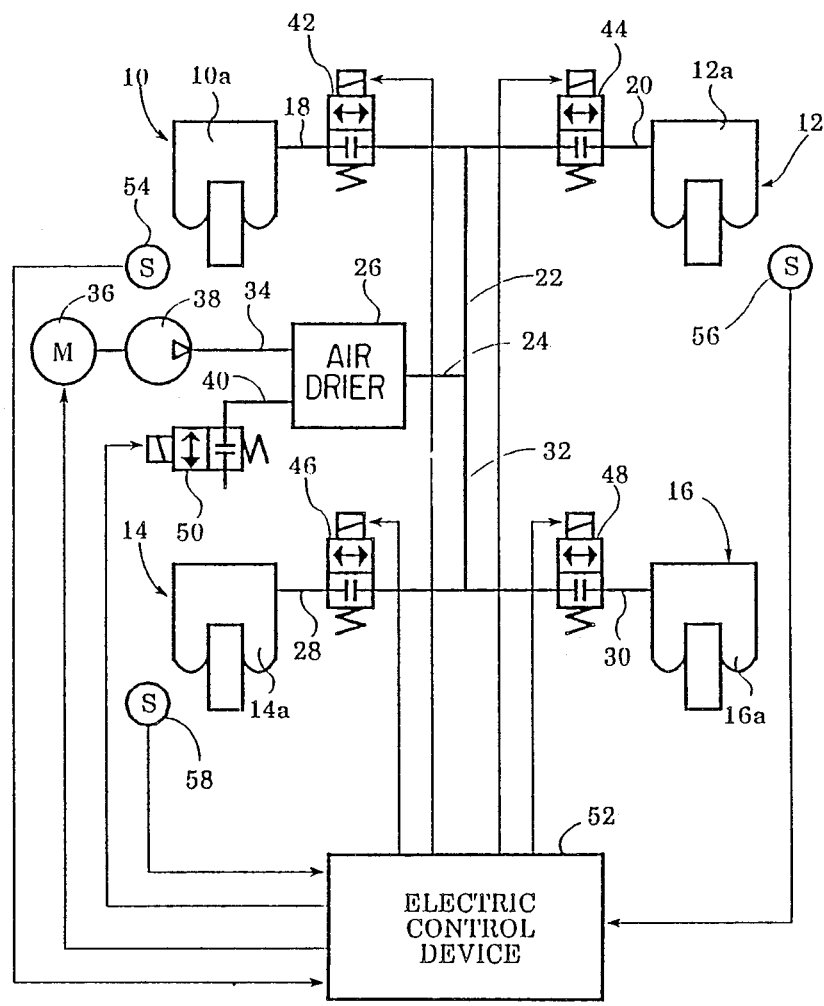
FIG. 1 is a diagrammatical illustration of an embodiment of the vehicle height control system according to the present invention.

Referring to FIG. 1, a vehicle height control system therein shown as an embodiment of the present invention comprises four actuators 10, 12, 14 and 16 for controlling vertical positions of a pair of front wheels (not shown) and a pair of rear wheels (not shown) respectively relative to a vehicle body (not shown), three vehicle height sensors 54, 56 and 58 for detecting the vertical positions relative to the vehicle body of three of the pairs of front and rear wheels except a fourth one of the four wheels. Here it is assumed that the actuators 10, 12, 14 and 16 correspond to a front left wheel, a front right wheel, a rear left wheel and a rear right wheel, respectively. Therefore, the vehicle height sensor 54 detects the vertical position relative to the vehicle body of the front left wheel, the vehicle height sensor 56 detects the vertical position relative to the vehicle body of the front right wheel, and the vehicle height sensor 58 detects the vertical position relative to the vehicle body of the rear left wheel. The fourth wheel, i.e. the rear right wheel, is provided with no vehicle height sensor. The actuators 10–16 are of an air suspension type having air chambers 10a, 12a, 14a and 16a, respectively.

Further, in FIG. 1, 38 is a compressor driven by a motor 36, and 26 is an air drier. 42, 44, 46, 48 and 50 designate on-off valves each of which is shiftable between an on state in which it provides a through passage and an off state in which it interrupts said through passage, as diagrammatical shown in FIG. 1. The switching over of these on-off valves between the two states is controlled by an electric control device 52. Therefore, when the compressor 38 is driven by the motor 36 with the on-off valve 50 being held in its off state, when the on-off valve 42 is opened, the air chamber 10a is supplied with a compressed air through a passage including conduits 34, 24, 22 and 18, so as thereby to increase the vertical position relative to the vehicle body of the front left wheel. Similarly, when the on-off valve 44 is opened, a compressed air is supplied to the pressure chamber 12a through a passage including conduits 34, 24, 22 and 20, so as thereby to increase the vertical position relative to the vehicle body of the front right wheel. Similarly, when the on-off valve 46 is opened, a compressed air is supplied to the pressure chamber 14a through a passage including conduits 34, 24, 22 and 28, so as thereby to increase the vertical position relative to the vehicle body of the rear left wheel. Also similarly, when the on-off valve 48 is opened, a compressed air is supplied to the pressure chamber 16a through a passage including conduits 34, 24, 32 and 30, so as thereby to increase the vertical position relative to the vehicle body of the rear right wheel.

By contrast, when the on-off valve 50 is opened with the compressor 38 being at rest, when the on-off valve 42 is opened, the air in the pressure chamber 10a is discharged through a passage including conduits 18, 22, 24 and 40, so as thereby to decrease the vertical position relative to the vehicle body of the front left wheel. Similarly, when the on-off valve 44 is opened, the air in the pressure chamber 12a is discharged through a passage including conduits 20, 22, 24 and 40, so as thereby to decrease the vertical position relative to the vehicle body of the front right wheel. Similarly, when the on-off valve 46 is opened, the air in the pressure chamber 14a is discharged through a passage including conduits 28, 32, 24 and 40, so as thereby to decrease the vertical position relative to the vehicle body of the rear left wheel. Similarly, when the on-off valve 48 is opened, the air in the pressure chamber 16a is discharged through a passage including conduits 30, 32, 24 and 40, so as thereby to decrease the vertical position relative to the vehicle body of the rear right wheel.

Figure 2:
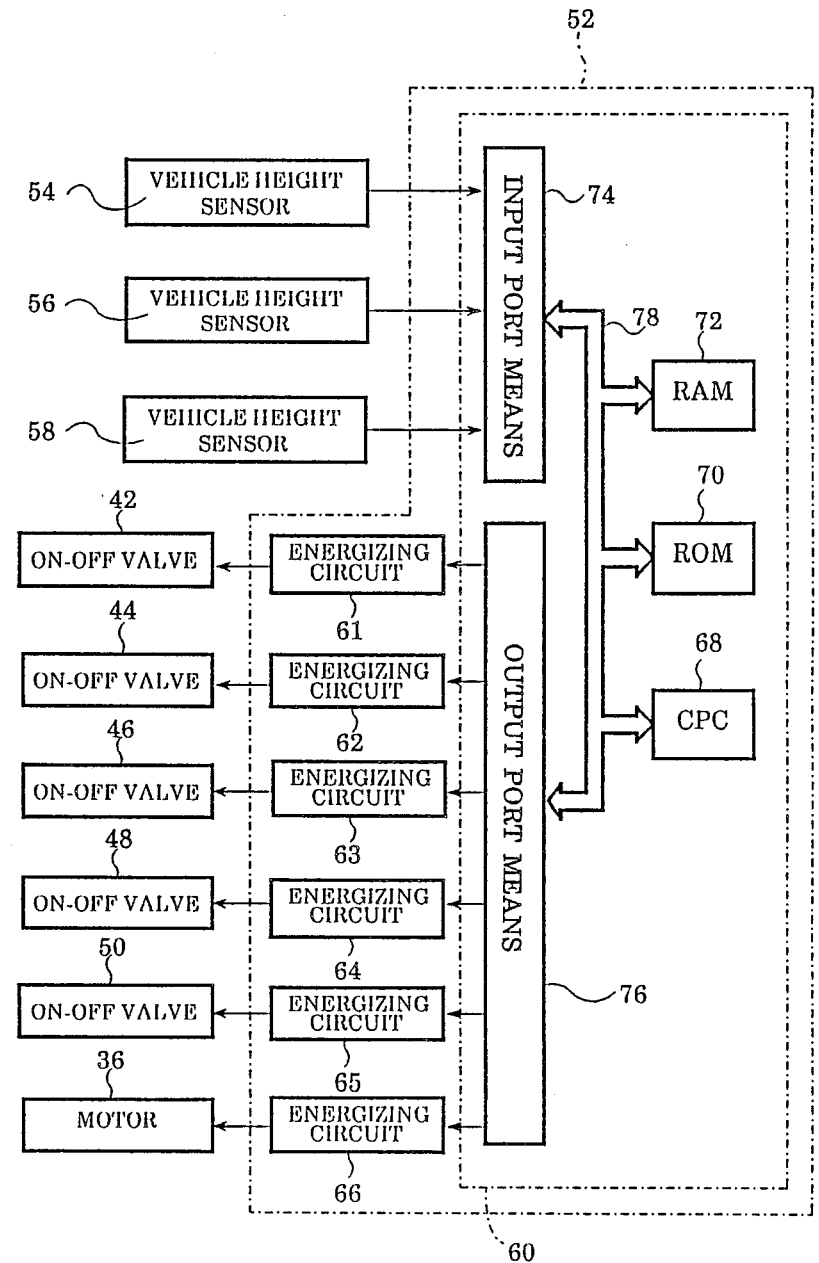
FIG. 2 is a diagrammatical illustration of the electrical control device incorporated in the system shown in FIG. 2.

The electric control device 52 may be conveniently be constructed in the form of an electronic computer as diagrammatically shown in FIG. 2. Such an electronic control device may be constructed in the conventional manner so as to include a central processing unit (CPU) 68, a read only memory (ROM) 70, a random access memory (RAM) 72, an input port means 74, an output port means 76 and a bass bar 78 interconnecting the above-mentioned computer construction means to provide a micro computer 60. The electric control device 52 further comprises energizing circuits 61-66 connected with the output port means 76 for selectively supplying the on-off valves 42-50 and the motor 36 with electric currents. Output signals of the vehicle height sensors 54-58 are supplied to the input port means 74.

The vehicle height control system shown in FIGS. 1 and 2 operates to maintain a determinate longitudinally and laterally balanced posture of the vehicle body by selectively supplying compressed air to selected ones of the air chambers 10a–16a or selectively discharging air from selected ones of the pressure chambers 10a–16a based upon differences of the vertical positions relative to the vehicle body of the front left wheel, the front right wheel and the rear left wheel from certain target values therefor stored in the ROM 70 so as to cancel the differences according to a program stored in the ROM 70 in the feedback control manner. Further detailed descriptions with regard to such a basic control operation of the vehicle height control system will be omitted to avoid redundancy of the specification. Hereinunder the particular deductive naught operation exclusion means incorporated in the vehicle height control system according to the present invention will be described in the form of a flowchart.

Figure 3:
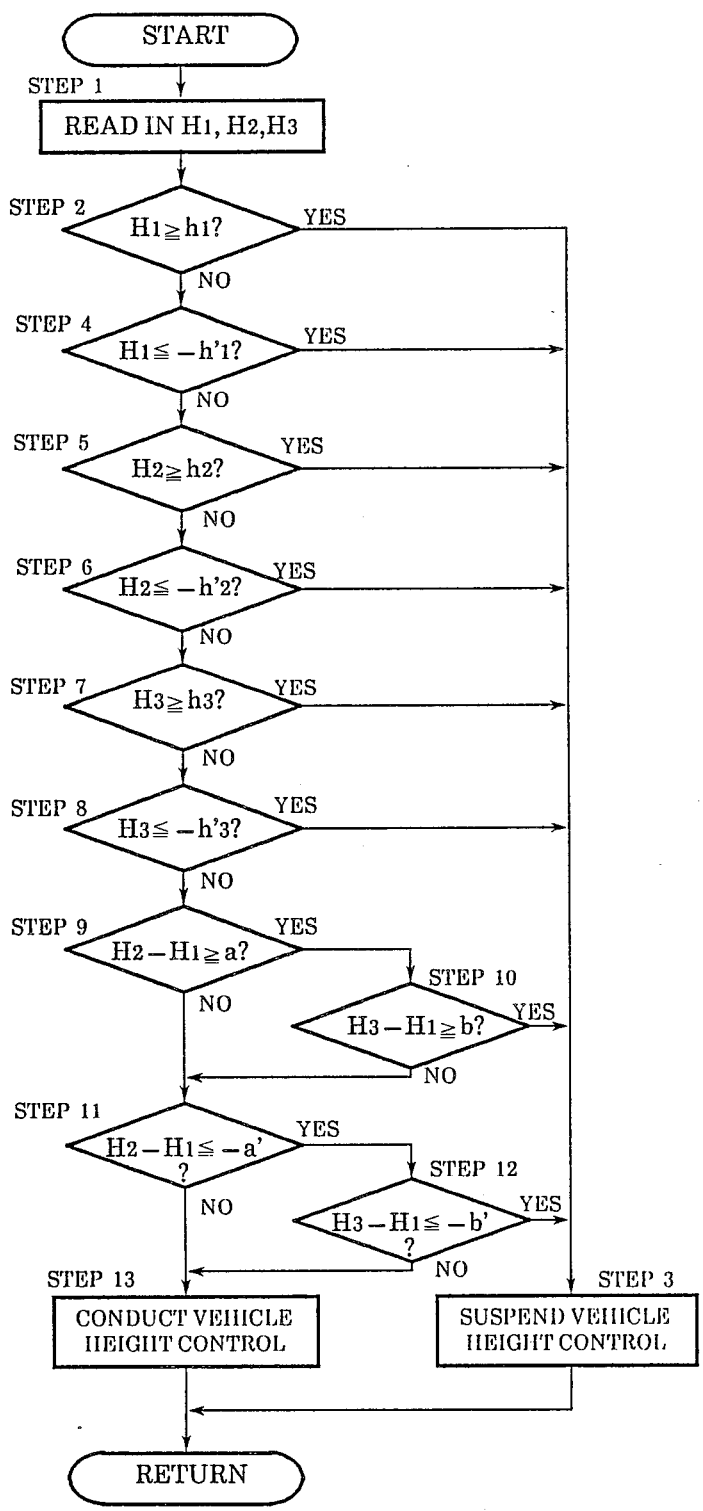
FIG. 3 is a flowchart illustrating the operation of an embodiment of the naught operation exclusion means incorporated in the vehicle height control system according to the present invention.

Referring to FIG. 3 which shows a first embodiment of the deductive naught operation exclusion means according to the present invention in the form of the operation thereof, first in step 1, the vertical position relative to the vehicle body of three of the pairs of front and rear wheels, i.e. the front left wheel, the front right wheel and the rear left wheel, are read in as $H_1$, $H_2$ and $H_3$, respectively. Then in step 2, it is checked if $H_1$ is equal to or greater than $h_1$ which is a positive threshold value corresponding to an abnormal increase of the vertical position relative to the vehicle body of the front left wheel that will occur when it has fallen in a hole or the like or the vehicle body has been jacked up at the front left wheel. If the answer is yes, the process proceeds to step 3 so as to suspend the vehicle height control operation by the vehicle height control system. If the answer is no, the process proceeds to step 4.

In step 4 it is checked if $H_1$ is equal to or smaller than $-h'_1$, wherein $h_1$ is a positive threshold value corresponding to an abnormal decrease of the vertical position relative to the vehicle body of the front left wheel that will occur when it has run on a rock or the like. If the answer is yes, the process proceeds to step 3, whereas if the answer is no, the process proceeds to step 5.

In steps 5–8 it is similarly checked if the front right wheel or the rear left wheel has fallen in a hole or the like or the vehicle body has been jacked up at the front right wheel or the rear left wheel or the front right wheel or the rear left wheel has run on a rock or the like. Therefore, further detailed descriptions with regard to these steps will be omitted to avoid redundancy of the specification.

Now if the process proceeds to step 9, it is checked if a difference $H_2 - H_1$ is equal to or greater than a which is a positive threshold value determined for checking if it is considered that the vertical position relative to the vehicle body of the front left wheel diagonal to the rear right wheel has abnormally decreased as compared with that of the front right wheel due to probably running on a rock or the like of the rear right wheel or jacking up of the vehicle body at the rear right wheel. If the answer is yes, the process proceeds to step 10, wherein it is further checked if a difference $H_3 - H_1$ is equal to or greater than b which is a positive threshold value determined for checking if it is considered that the vertical position relative to the vehicle body of the front left wheel has abnormally decreased as compared with that of the rear left wheel due to probably running on a rock or the like of the rear right wheel jacking up of the vehicle body at the rear right wheel. If the answer is yes, the process proceeds to step 3 to suspend the vehicle height control operation by the vehicle height control system. If the answer in step 9 is no or the answer in step 10 is no, the process proceeds to step 11.

In step 11 it is checked if a difference $H_2 - H_1$ is equal to or smaller than $-a'$, wherein $a'$ is a positive threshold value determined for checking if it is considered that the vertical position relative to the vehicle body of the front left wheel diagonal to the rear right wheel has abnormally increased as compared with that of the front right wheel due to probably falling in a hole or the like of the rear right wheel. If the answer is yes, the process proceeds to step 12, wherein it is further checked if a difference $H_3 - H_1$ is equal to or smaller than $-b'$, wherein $b'$ is a positive threshold value determined for checking if it is considered that the vertical position relative to the vehicle body of the front left wheel has abnormally increased as compared with that of the rear left wheel due to probably falling in a hole or the like of the rear right wheel. If the answer is yes, the process proceeds to step 3 to suspend the vehicle height control operation by the vehicle height control system. If the answer in step 11 is no or the answer in step 12 is no, the process proceeds to step 13 to conduct vehicle height control operation by the vehicle height control system. Then the process proceeds to return to repeat the above control operations.

In the control according to FIG. 3 running on a rock or the like of the rear right wheel or jacking up of the vehicle body at the rear right wheel or falling in a hole or the like of the rear right wheel is guessed to have happened when the vertical position relative to the vehicle body of the front left wheel has abnormally decreased or increased as compared with that of the front right wheel as well as that of the rear left wheel located on opposite sides of a diagonal line connecting the front left wheel and the rear right wheel. By confirming these two conditions it will be infallibly detected that the rear right wheel has run on a rock or the like or fallen in a hole or the like or the vehicle body has been jacked up at the rear right wheel. However, as an alternative, it will also be possible to detect running on a rock or the like or falling in a hole or the like of the rear right wheel or jacking up of the vehicle body at the rear right wheel by checking if the sum of a decrease of the vertical position relative to the vehicle body of the front left wheel as compared with that of the front right wheel and a decrease of the vertical position relative to the vehicle body of the front left wheel as compared with that of the rear left wheel has exceeded a certain threshold value. In this case the sum of the two decreases may be made with proper modification factors.

Figure 4:
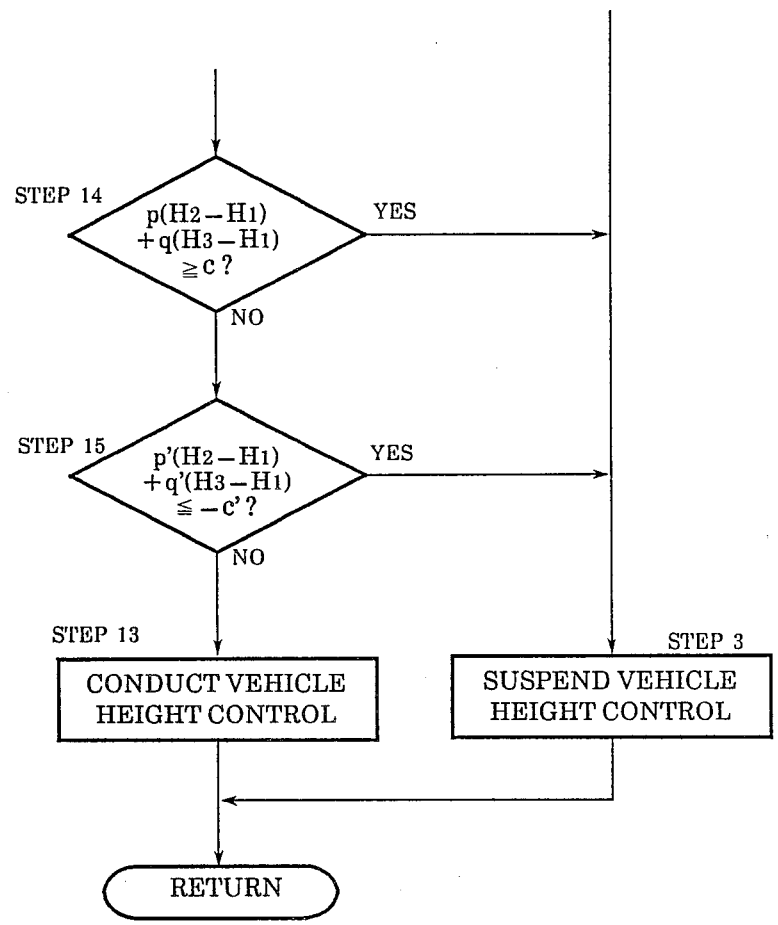
FIG. 4 is a flowchart illustrating the operation of another embodiment of the naught operation exclusion means incorporated in the vehicle height control system according to the present invention.

Such an alternative embodiment is shown in FIG. 4, wherein step 14 is adapted to be conducted in place of steps 9 and 10 in FIG. 3. In step 14 a difference $H_2-H_1$ and a difference $H_3-H_1$ are added with modification factors p and q, respectively, and it is checked if the sum is equal to or greater than c which is a threshold value determined for checking if it is considered that the vertical position relative to the vehicle body of the front left wheel diagonal to the rear right wheel has decreased so much as compared with those of the front right wheel and the rear left wheel as to indicate running on a rock or the like of the rear right wheel or jacking up of the vehicle body at the rear right wheel. Similarly, step 15 in FIG. 4 is to replace steps 11 and 12 in FIG. 3. In step 15 it is checked if the sum of a difference $H_2-H_1$ and a difference $H_3-H_1$ with respective modification factors p' and q' is equal to or smaller than $-c'$, wherein c' is a positive threshold value determined for checking if it is considered that the increase of the vertical position relative to the vehicle body of the front left wheel as compared with those of the front right wheel and the rear left wheel is so great as to indicate a falling in a hole or the like of the rear right wheel.

In step 13 or 14 the modification factors for summing such as p, q, p' and q' may be appropriately determined in consideration of the difference in affecting of the falling or rising of the rear right wheel due to running on a rock or the like or falling in a hole or the like or jacking up of the vehicle body on rising or falling of the front left wheel relative to the front right wheel and the rear left wheel, according to the structural features of each automotive vehicle. In some cases these modification factors may all be 1.00.

Thus, according to the present invention, running on a rock or the like or falling in a hole or the like of a fourth wheel or jacking up of the vehicle body at the fourth wheel for which no vehicle height sensor for detecting the vertical position thereof relative to the vehicle body is provided is deductively checked, and it is desirably avoided that the vehicle height control system does a naught operation such as to operate the vehicle height control actuator for the wheel in its only temporary running on a rock or the like or falling in a hole or the like.

Although the invention has been described in detail with respect to some preferred embodiments thereof, it will be understood by one of ordinary skill in the art that various modifications would be possible with regard to the shown embodiments without departing from the spirit of the invention.

We claim:

1. A vehicle height control system comprising four actuator means for controlling vertical positions of a pair of front wheels and a pair of rear wheels relative to a vehicle body, three vehicle height sensor means for detecting said vertical positions relative to the vehicle body of three of said pairs of front and rear wheels except a fourth one of said pairs of front and rear wheels and for providing output signals indicative of the detected positions, an actuator control means for selectively operating each said actuator means so as to maintain a determinate longitudinally and laterally balanced posture of the vehicle body according to said output signals of said three vehicle height sensors, and a naught operation exclusion means which compares the output signal of one said vehicle height sensor means for detecting said vertical position relative to the vehicle body of one said wheel diagonal to said fourth wheel with the output signal of each one of the other two said vehicle height sensor means so as to detect at least either an abnormal rise or an abnormal fall of said fourth wheel relative to the vehicle body, and prevent said actuator control means from controlling said actuator means when at least either said abnormal rise or said abnormal fall of said fourth wheel relative to the vehicle body is detected.

2. A vehicle height control system according to claim 1, wherein said naught operation exclusion means prevents said actuator control means from controlling said actuator means when a positive difference of the vertical position relative to the vehicle body of said one wheel detected by said one vehicle height sensor means with respect to a vertical position relative to the vehicle body detected by one of two other said vehicle height sensor means is equal to or greater than a predetermined positive threshold value and a positive difference of the vertical position relative to the vehicle body of said one wheel detected by said one vehicle height sensor means with respect to a vertical position relative to the vehicle body detected by the other of said two other vehicle height sensor means is equal to or greater than a predetermined positive threshold value.

3. A vehicle height control system according to claim 1, wherein said naught operation exclusion means prevents said actuator control means from controlling said actuator means when a negative difference of the vertical position relative to the vehicle body of said one wheel detected by said one vehicle height sensor means with respect to a vertical position relative to the vehicle body detected by one of two other said vehicle height sensor means is equal to or smaller than a predetermined negative threshold value and a negative difference of the vertical position relative to the vehicle body of said one wheel detected by said one vehicle height sensor means with respect to a vertical position relative to the vehicle body detected by the other of said two other vehicle height sensor means is equal to or smaller than a predetermined negative threshold value.

4. A vehicle height control system according to claim 1, wherein said naught operation exclusion means prevents said actuator control means from controlling said actuator means when a sum of a positive difference of the vertical position relative to the vehicle body of said one wheel detected by said one vehicle height sensor means with respect to a vertical position relative to the vehicle body detected by one of two other said vehicle height sensor means and a positive difference of the vertical position relative to the vehicle body of said one wheel detected by said one vehicle height sensor means with respect to a vertical position relative to the vehicle body detected by the other of said two other vehicle height sensor means with respective positive modification factors is equal to or greater than a predetermined positive threshold value.

5. A vehicle height control system according to claim 1, wherein said naught operation exclusion means prevents said actuator control means from controlling said actuator means when a sum of a negative difference of said vertical position relative to the vehicle body of said one wheel detected by said one vehicle height sensor means with respect to a vertical position relative to the vehicle body detected by one of two other said vehicle height sensor means and a negative difference of the vertical position relative to the vehicle body of said one wheel detected by said one vehicle height sensor means with respect to a vertical position relative to the vehicle body detected by the other of said two other vehicle height sensor means with respective positive modification factors is equal to or smaller than a predetermined negative threshold value.

* * * * *